(12) United States Patent
Sternagle

(10) Patent No.: US 7,020,707 B2
(45) Date of Patent: Mar. 28, 2006

(54) SCALABLE, RELIABLE SESSION INITIATION PROTOCOL (SIP) SIGNALING ROUTING NODE

(75) Inventor: Richard Henry Sternagle, Raleigh, NC (US)

(73) Assignee: Tekelec, Calabasas, CA (US)

( * ) Notice: Subject to any disclaimer, the term of this patent is extended or adjusted under 35 U.S.C. 154(b) by 852 days.

(21) Appl. No.: 09/867,879

(22) Filed: May 30, 2001

(65) Prior Publication Data

US 2002/0184376 A1 Dec. 5, 2002

(51) Int. Cl.
*G06F 15/16* (2006.01)

(52) U.S. Cl. .................. 709/230; 709/227; 709/224; 707/10; 370/352

(58) Field of Classification Search .......... 709/227–228, 709/238, 213–214, 201, 230, 224; 707/10; 370/352

See application file for complete search history.

(56) References Cited

U.S. PATENT DOCUMENTS

| 5,937,343 | A * | 8/1999 | Leung ................... 455/403 |
| 6,088,721 | A * | 7/2000 | Lin et al. ............... 709/214 |
| 6,105,034 | A | 8/2000 | Buckler |
| 6,366,577 | B1 | 4/2002 | Donovan |
| 6,385,198 | B1 | 5/2002 | Ofek et al. |
| 6,404,746 | B1 | 6/2002 | Cave et al. |
| 6,421,674 | B1 * | 7/2002 | Yoakum et al. ............. 707/10 |
| 6,601,099 | B1 * | 7/2003 | Corneliussen ............. 709/224 |
| 6,615,236 | B1 * | 9/2003 | Donovan et al. .......... 709/203 |
| 6,625,141 | B1 * | 9/2003 | Glitho et al. ............. 709/227 |
| 6,636,596 | B1 * | 10/2003 | Gallant et al. ......... 379/220.01 |
| 6,650,901 | B1 * | 11/2003 | Schuster et al. ......... 455/456.1 |
| 6,738,390 | B1 * | 5/2004 | Xu et al. ................. 370/467 |
| 6,757,732 | B1 * | 6/2004 | Sollee et al. ............. 709/227 |
| 6,779,039 | B1 * | 8/2004 | Bommareddy et al. ..... 709/238 |
| 2002/0075844 | A1 * | 6/2002 | Hagen ..................... 370/351 |
| 2002/0110113 | A1 * | 8/2002 | Wengrovitz ............. 370/352 |
| 2002/0145975 | A1 * | 10/2002 | MeLampy et al. ......... 709/238 |
| 2002/0176404 | A1 * | 11/2002 | Girard ..................... 370/352 |

OTHER PUBLICATIONS

Handley et al., "SIP: Session Initiation Protocol," IETF RFC 2543, p. 1-153, (Mar. 1999).
Handley et al., "SDP: Session Description Protocol," IETF RFC 2327, p. 1-42, (Apr. 1998).
S. Paul et al., "Reliable Multicast Transport Protocol (RMTP)," IEEE Journal on Selected Areas in Communications, vol. 15, No. 3, p. 407-421, (Apr. 1997).
Lin et al., "A Reliable Multicast Transport Protocol," IEEE INFOCOM, p. 1414-1424, (1996).

* cited by examiner

*Primary Examiner*—Philip B. Tran
(74) *Attorney, Agent, or Firm*—Jenkins, Wilson, Taylor & Hunt, P.A.

(57) ABSTRACT

A scalable, reliable session initiation protocol (SIP) signaling router includes cluster nodes for performing SIP services. A location server replicates its database of SIP location information to each of the cluster nodes. Because each cluster node maintains its own local copy of the SIP location database, the time for routing SIP signaling messages is decreased. Load sharing is also performed among the cluster nodes by Ethernet switches that connect the cluster nodes to external networks. One Ethernet switch periodically sends messages to each of the cluster nodes to monitor the operational status of the cluster nodes. The Ethernet switch also maintains a connection tuple table containing information regarding active connections to each of the cluster nodes. Load sharing is performed based on the operational status and the connection tuple table.

22 Claims, 9 Drawing Sheets

SCALABLE, RELIABLE SESSION INITIATION PROTOCOL (SIP) SIGNALING ROUTING NODE

TECHNICAL FIELD

The present invention relates to the session initiation protocol. More particularly, the present invention relates to a scalable, reliable session initiation protocol signaling routing node.

BACKGROUND ART

The session initiation protocol or "SIP" is an application-layer control protocol for creating, modifying, and terminating sessions between communicating parties. The sessions include Internet multimedia conferences, Internet telephone calls, and multimedia distribution. Members in a session can communicate via unicast, multicast, or a mesh of unicast communications.

The SIP protocol is described in Handley et. al., *SIP: Session Initiation Protocol*, Internet Engineering Task Force (IETF) Request for Comments (RFC) 2543, March, 1999, the disclosure of which is incorporated herein by reference in its entirety. A related protocol used to describe sessions between communicating parties is the session description protocol. The session description protocol is described in Handley and Jacobsen, *SDP: Session Description Protocol*, IETF RFC 2327, April 1998, the disclosure of which is incorporated herein by reference in its entirety.

The SIP protocol defines several types of entities involved in establishing sessions between calling and called parties. These entities include: proxy servers, redirect servers, user agent clients, and user agent servers. A proxy server is an intermediary program that acts as both a server and a client for the purpose of making requests on behalf of other clients. Requests are serviced internally or by passing them on, possibly after translation to other servers. A proxy interprets, and, if necessary, rewrites a request message before forwarding the request. An example of a request in the SIP protocol is an INVITE message used to invite the recipient to participate in a session.

A user agent server is an application that contacts a user when a SIP request is received and that returns a response on behalf of the user. A user agent client is an application that initiates a SIP request. In a SIP network, user agent client and server software may execute on an end user device, such as a SIP telephone, to initiate and accept calls on behalf of the user.

A redirect server accepts a SIP request, maps the address into zero or more new addresses and returns these addresses to a client. Unlike a proxy server, a redirect server does not initiate its own SIP requests. Unlike a user agent server, a redirect server does not accept calls.

According to the SIP protocol, objects are identified by SIP URLs. A SIP URL may be of the form user@host. The user part may be a user name or a telephone number. A called party may move between a number of different systems or locations over time. These locations may be dynamically registered with a SIP server. A location server may also use one or more other protocols, such as finger, rwhois, LDAP, multicast protocols, or other operating-system-dependent mechanisms to locate an end system where the called party might be reachable.

FIG. 1 is a message flow diagram recreated from the above-referenced SIP protocol specification that illustrates the function of the SIP proxy server in establishing a typical SIP call. In FIG. 1, a user with a SIP URL of cz@cs.tuberlin.de located at a first computer 100 in the domain cs.berlin.de is attempting to establish a call with another user with a SIP URL of henning@cs.col. In order to initiate the call, in step 1, the SIP user agent software resident on computer 100 sends an INVITE message to a SIP proxy server 102. The INVITE message includes the SIP URL of the called party, i.e., henning@cs.col. Since SIP proxy server 102 may not know the actual location of the user henning@cs.col, in step 2, SIP proxy server 102 queries a location server 104 to determine where to send the INVITE message. In step 3, location server 104 responds with the current location of the user "henning". In the illustrated example, the location is specified as hgs@lab.

In step 4, SIP proxy server 102 forwards the INVITE message to computer 106 at which the user "henning" is located. SIP user agent software resident on computer 106 responds to the INVITE message with a 200 OKAY message indicating acceptance to the invitation to the session. In step 7, SIP proxy server 102 forwards the 200 OKAY message to computer 100. In step 8, computer 100 forwards an acknowledgement message to SIP proxy server 102. In step 9, SIP proxy server 102 forwards the acknowledgement message to computer 106. Once the acknowledgement is received by computer 106, a multi-media session is established between the two users.

One potential problem that is not addressed in the SIP protocol specification is how to reliably and efficiently provide location information to SIP servers, such as SIP proxy servers and SIP redirect servers. Conventional SIP servers utilize a centralized database, as illustrated in FIG. 1, to obtain SIP location information. This solution is undesirable because using a centralized server to provide the location information causes a performance bottleneck at the location server. That is, as the number of subscribers and location queries increase, the location server can become overwhelmed with location requests. As a result, location requests may be delayed or even dropped by the location server.

Another problem that is not addressed by the SIP protocol specification is how to provide reliability and scalability in SIP protocol servers, such as proxy servers and redirect servers. As the number of SIP users increases, the demands on SIP protocol servers will also increase. If a SIP protocol server fails, users may be left without SIP signaling service. The SIP protocol specification does not address methods of increasing scalability or reliability of SIP protocol servers. The SIP protocol specification merely discusses the functional requirements of these servers, in general.

Thus, there exists a long felt need for a scalable, reliable SIP signaling router that avoids at least some of the difficulties not addressed by the SIP protocol specification or by conventional SIP signaling routers.

DISCLOSURE OF THE INVENTION

According to one aspect, the present invention includes a scalable, reliable, SIP signaling router. The SIP signaling router includes a plurality of cluster nodes for performing at least one SIP protocol function, such as SIP proxy services or SIP redirect services. Each of the cluster nodes stores a local database including SIP location information. A location server is coupled to each of the cluster nodes for maintaining a database of SIP location information. The location server automatically replicates the database of SIP location information to each of the cluster nodes in real time in response to receiving updates to the SIP location information.

Because the location server replicates a copy of its database to each of the cluster nodes, the cluster nodes can respond to SIP queries faster than conventional SIP proxy servers that are required to access an external location server to obtain SIP location information.

According to another aspect, the present invention includes a method for monitoring the operational status of cluster nodes performing SIP protocol functions, load sharing between the cluster nodes based on the operational status, and rerouting messages in the event of failure of one of the cluster nodes. In order to determine the operational status, an Ethernet switch periodically sends health check and ping messages to each of the plurality of cluster nodes. Operational status may be determined based on the response time for the ping and health check messages. The Ethernet switch may also maintain a connection tuple table that includes entries storing connection information for connections serviced by each of the cluster nodes. The load balancing may be performed based on the response time to the ping and health check messages and the number of connections in progress with each of the cluster nodes, as evidenced by the connection tuple table for each node.

In order to maintain reliable connectivity between the cluster nodes and external networks, a standby Ethernet switch is provided in addition to the active Ethernet switch. The active Ethernet switch replicates its connection tuple table to the standby Ethernet switch using a spanning tree algorithm. Each of the cluster nodes includes a connection to the active Ethernet switch and a connection to the standby Ethernet switch. In the event of failure of the active Ethernet switch, operation automatically switches to the standby Ethernet switch.

Accordingly, it is an object of the present invention to provide a scalable, reliable SIP signaling router.

It is another object of the present invention to provide a SIP signaling router in which a location server replicates its database of SIP location information to SIP cluster nodes that perform SIP protocol functions.

It is yet another object of the present invention to provide operational status monitoring, load sharing, and reliable network connection for cluster nodes performing SIP protocol functions.

BRIEF DESCRIPTION OF THE DRAWINGS

Preferred embodiments of the invention will now be explained with reference to the accompanying drawings, of which.

DETAILED DESCRIPTION OF THE INVENTION

Figure 1:
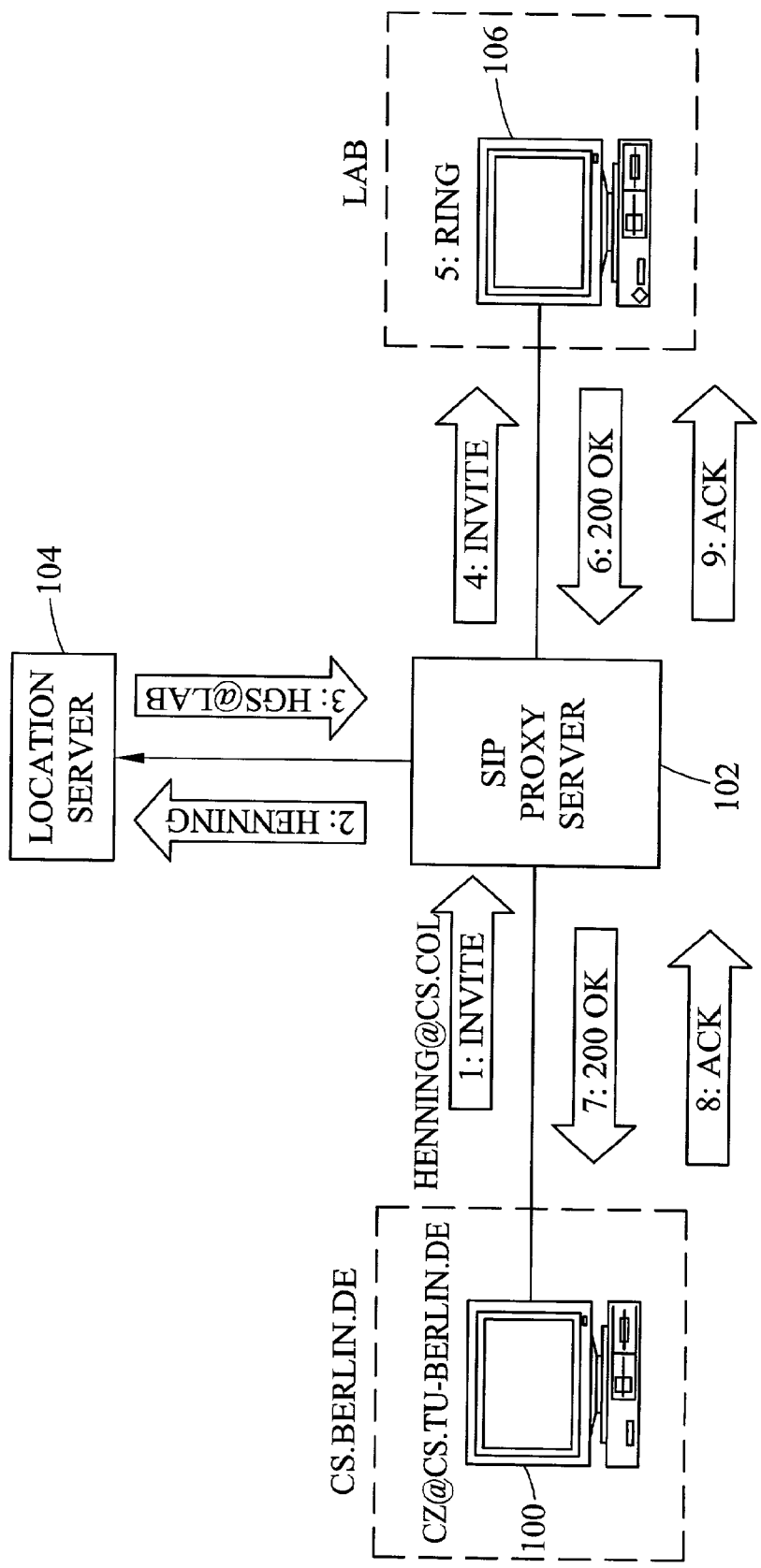
FIG. 1 is a message flow diagram illustrating the functionality of a conventional SIP proxy server in establishing a SIP session.
Figure 2:
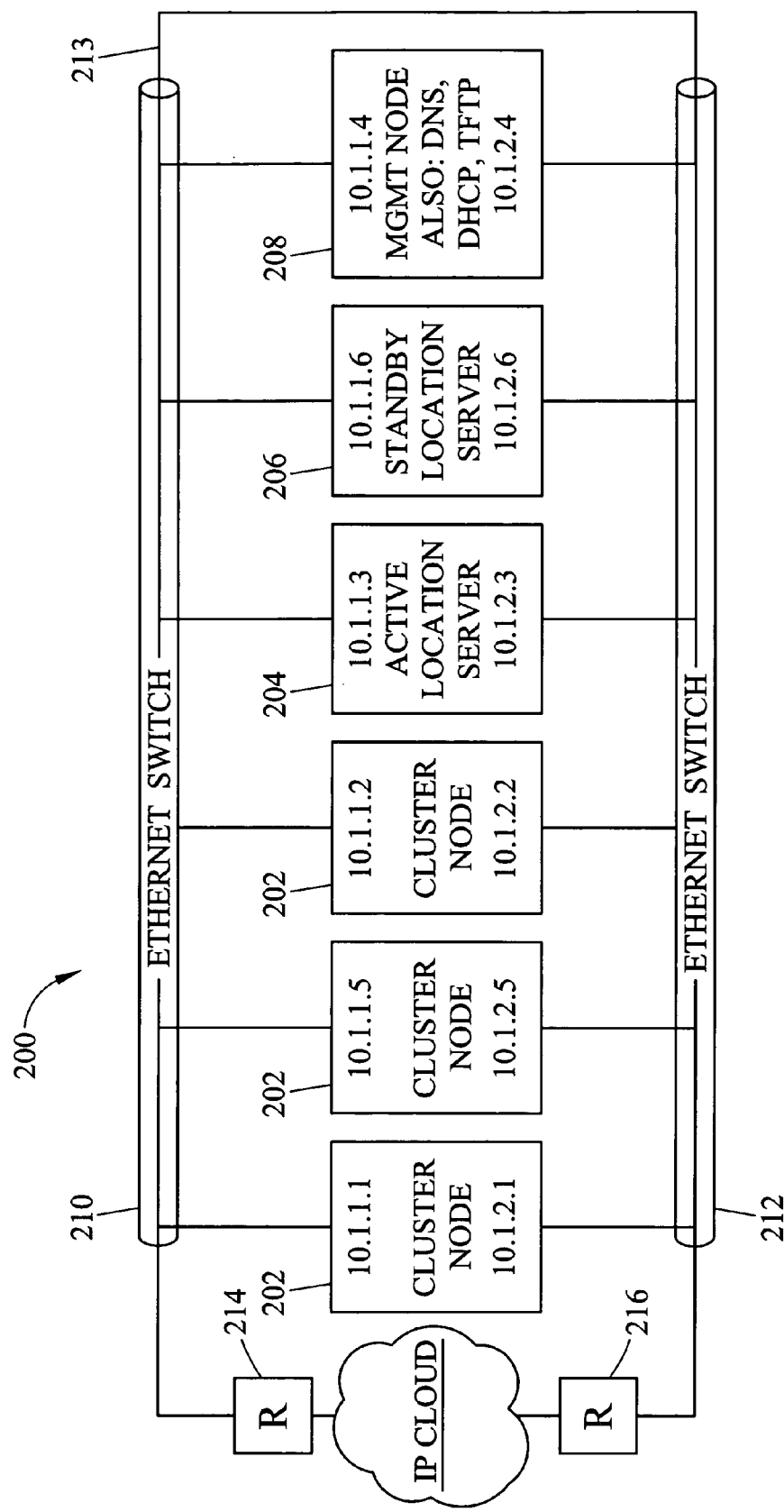
FIG. 2 is a block diagram of a scalable, reliable SIP signaling router according to an embodiment of the present invention.

FIG. 2 is block diagram of a scalable, reliable SIP signaling router according to an embodiment of the present invention. In FIG. 2, SIP signaling router 200 includes a plurality of cluster nodes 202 that perform SIP protocol functions. For example, cluster nodes 202 may comprise SIP proxy servers, SIP redirect servers, or combination proxy/redirect servers. An active location server 204 maintains a database of SIP location information and replicates the database to SIP cluster nodes 202 and to a standby location server 206. Standby location server 206 provides a redundant copy of the SIP location database maintained by active location server 204 in the event of failure of active location server 204. Management node 208 performs network management functions and other services, such as domain name system (DNS) service, dynamic host configuration protocol (DHCP) service, and trivial file transfer protocol (TFTP) service. An exemplary hardware platform suitable for nodes 202, 204, 206, and 208 is the NETRA™ T1 available from SUN Microsystems.

In order to provide connectivity to external networks, SIP signaling router 200 includes active Ethernet switch 210 and standby Ethernet switch 212. Ethernet switches 210 and 212 may be connected to each other by a high-speed link 213. High-speed link 213 may be any type of high-speed link, such as a gigabit Ethernet link. High-speed link 213 may be used for inter-switch communication, such as exchange of a connection tuple table, which will be described below. In order to provide redundant network layer connectivity to external networks, Ethernet switches 210 and 212 are connected to primary and backup IP routers 214 and 216. In the illustrated example, each of the cluster nodes 202, location servers 204 and 206, and management node 208 include two Ethernet interfaces—one connected to active Ethernet switch 210 and the other connected to standby Ethernet switch 212.

In order to provide reliability among cluster nodes, multiple cluster nodes provide redundancy for each other. In this configuration, if a cluster node fails, one or more of the other redundant load-sharing nodes will continue providing SIP service provided by signaling router 200.

Real Time Replication of SIP Location Database

As stated above, an important feature of the invention is the fact that active location server 204 replicates its database of SIP location information to cluster nodes 202 in real time. As a result of this real time replication of the SIP location database, cluster nodes 202 can route SIP signaling messages based on their own local copies of the SIP location database. This greatly increases routing speed over conventional SIP proxy servers that depend on a centralized location database.

Figure 3:
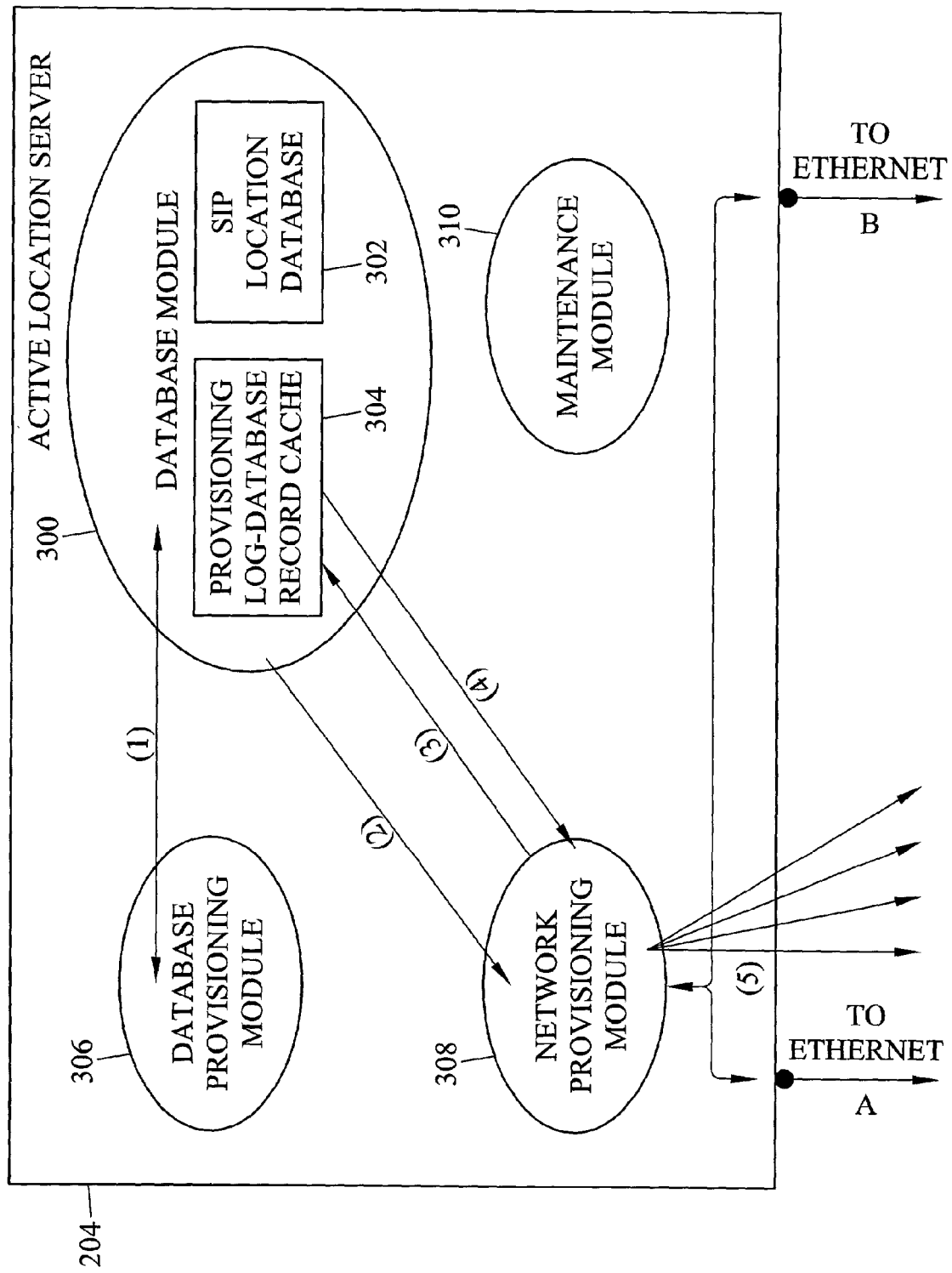
FIG. 3 is a flow diagram illustrating exemplary steps for replicating a SIP location database from a location server to a plurality of SIP protocol servers according to an embodiment of the present invention.

FIG. 3 is a block diagram of active location server 204 illustrating the steps for replicating the SIP location database to cluster nodes 202 in real time. In the example illustrated in FIG. 3, active location server 204 includes a database module 300 for maintaining a SIP location database 302 and a provisioning log 304 for the SIP location database. A database provisioning module 306 provisions new SIP location information in SIP location database 302. Provisioning module 306 may also interface with an external user to allow the user to manually input data to be provisioned in database 302. Network provisioning module 308 replicates the SIP location database to cluster nodes 202 and standby location server 206. Finally, maintenance module 310 controls the overall operations of active location server 204. It is understood that modules 300, 304, 306, 308, and 310 may be implemented in hardware, software, or a combination of hardware and software.

Referring to the message flow illustrated in FIG. 3, in step 1, provisioning module 306 and database module 300 communicate to update one or more records in SIP location database 302. When the records are updated, database module 300 stores the updated records in provisioning log 304. In step 2, database module 300 notifies network provisioning module 308 of the existence of changed database records by indicating the latest database level. In step 3, network provisioning module 308 requests real time database file records affected by the update indicated in provisioning log 304. This step may be performed periodically.

In step 4, database module 300 sends the updated records stored in provisioning log 304 to network provisioning module 308. In step 5, network provisioning module 308 multicasts the database update to cluster nodes 202 and to standby location server 206. In a preferred embodiment of the invention, the multicasting is performed via the reliable multicast protocol (RMTP) II protocol. The RMTP II protocol is described in *Reliable Multicast Transport Protocol* (RMTP), S. Paul et al., IEEE Journal on Selected Areas in Communications, volume 15, number 3, April 1997, pages 407–421, and *RMTP: A Reliable Multicast Transport Protocol*, Lynn et al., Proceedings of IEEE INFOCOM '96, pages 1414–1424, the disclosures of each of which are incorporated herein by reference in their entirety. In addition, exemplary software for RMTP can be downloaded free of charge from www.bell-labs.com/project/rmtp/rmtp.html.

RMTP is a reliable multicast transport protocol for the Internet. RMTP provides sequenced, lossless delivery of a data stream from one sender to a group of receivers. RMTP is based on a multi-level hierarchical approach, in which the receivers are grouped into a hierarchy of local regions, with a designated receiver in each local region.

Receivers in each local region periodically send acknowledgements to their corresponding designated receiver. The designated receivers send acknowledgements to the higher-level designated receivers, until the designated receivers in the highest level send acknowledgements to the sender, thereby avoiding the acknowledgement implosion problem. Designated receivers cache receive data and respond to retransmission requests of the receivers in their corresponding local regions, thereby decreasing end-to-end latency. RMTP uses a packet-based selective repeat retransmission scheme for higher throughput.

Reliability in RMTP is achieved through a multi-level hierarchical approach in which leaf receivers periodically send status message to designated receivers. Status messages consist of the lower end of the flow control window and a bit vector indicating which packets are received and lost relative to the window's lower end. Designated receivers, in turn, send their status periodically to higher layer designated receivers and so on until the designated receivers at the highest level send their status to the sender. Lost packets are recovered by local retransmissions by their designated receiver. Retransmissions are either unicast or multicast based a threshold.

Flow control in RMTP is achieved by a combination of rate control and window based control. The sender can set its maximum rate before a session begins and then it can adjust its rate based on the status of receivers. RMTP used a TCP-like slow start mechanism when congestion is sensed (e.g., multiplicative back off and linear increase of window size).

Figure 4:
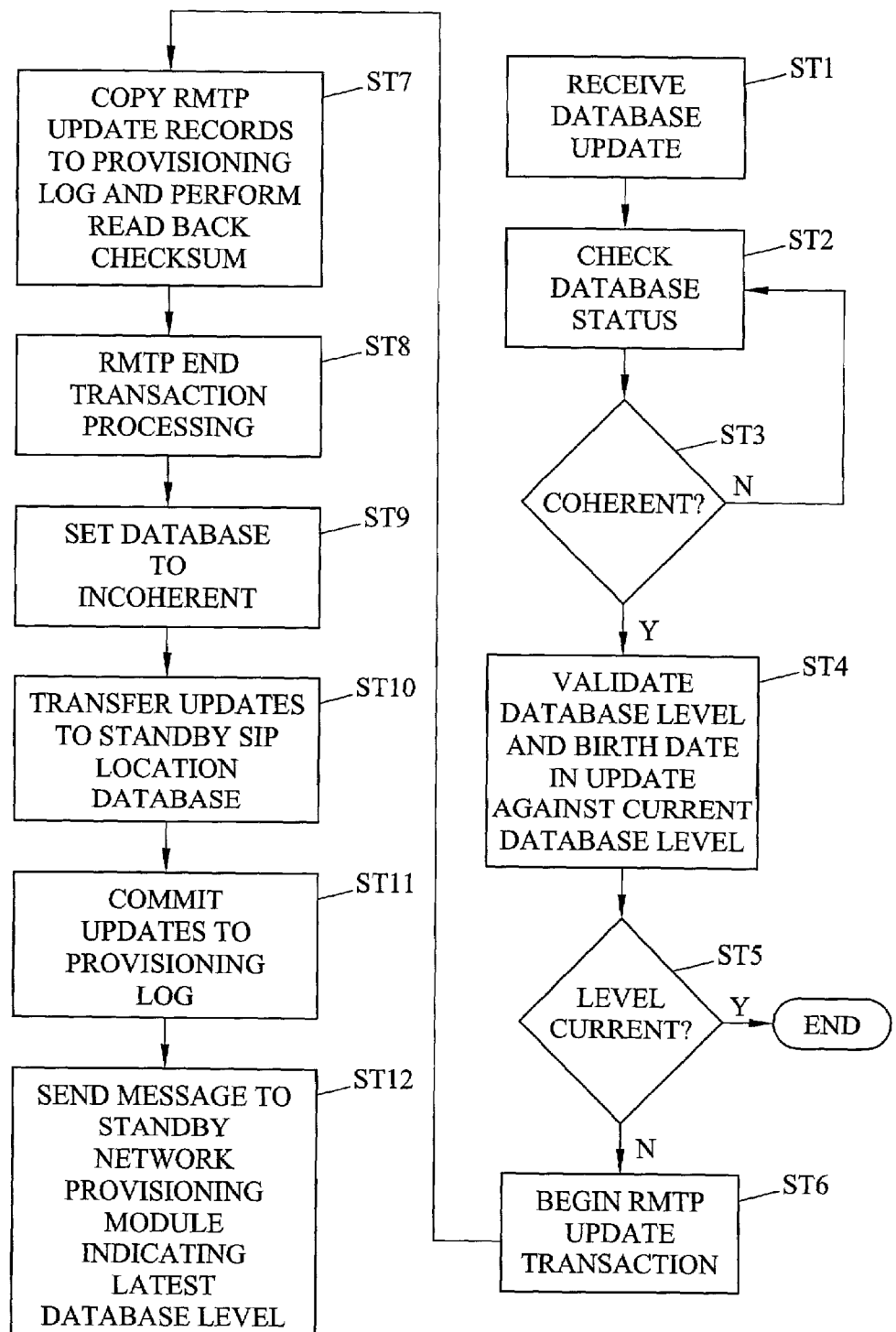
FIG. 4 is a flow chart illustrating exemplary steps for incremental loading of the SIP location database maintained by standby location server 206.

FIG. 4 is a flow chart illustrating exemplary steps performed by standby location server 206 in response to receiving an update from active location database 204. The components of standby location server 206 are the same as those of active location server 204. Hence, a detailed description thereof will not be repeated herein. Referring to FIG. 4, in step ST1, standby location server 206 receives a database update from active location server 204. In step ST2, standby location server 206 checks the status of its local SIP location database. In step ST3, if standby location server 206 determines that the database is not coherent, standby location server 206 continues to check the database status until the database is coherent. If the database is determined to be coherent, control proceeds to step ST4 where standby location server 206 validates the database level and birth date in the received database update against the current database level. In step ST5, if the database level of the SIP location database is determined to be current, the update procedure ends.

In step ST6, if the database level is determined not to be current, standby location server 206 begins the RMTP update transaction. In step ST7, standby location server 206 copies the RMTP update records to its provisioning log, reads the records written into the provisioning log, and verifies that the records were correctly written with a checksum. In step ST8, RMTP end transaction processing begins. In step ST9, the SIP location database maintained by standby location server 206 is set to incoherent. The purpose of setting the database to incoherent is to prevent modification or reading by another process while the database is being updated. In step ST10, standby location server 206 transfers the received updates into its SIP location database. In step ST11, standby location server 206 commits the updates to its provisioning log. In step ST12, standby location server 206 sends a message to its standby network provisioning module indicating the latest database level.

Figure 5:
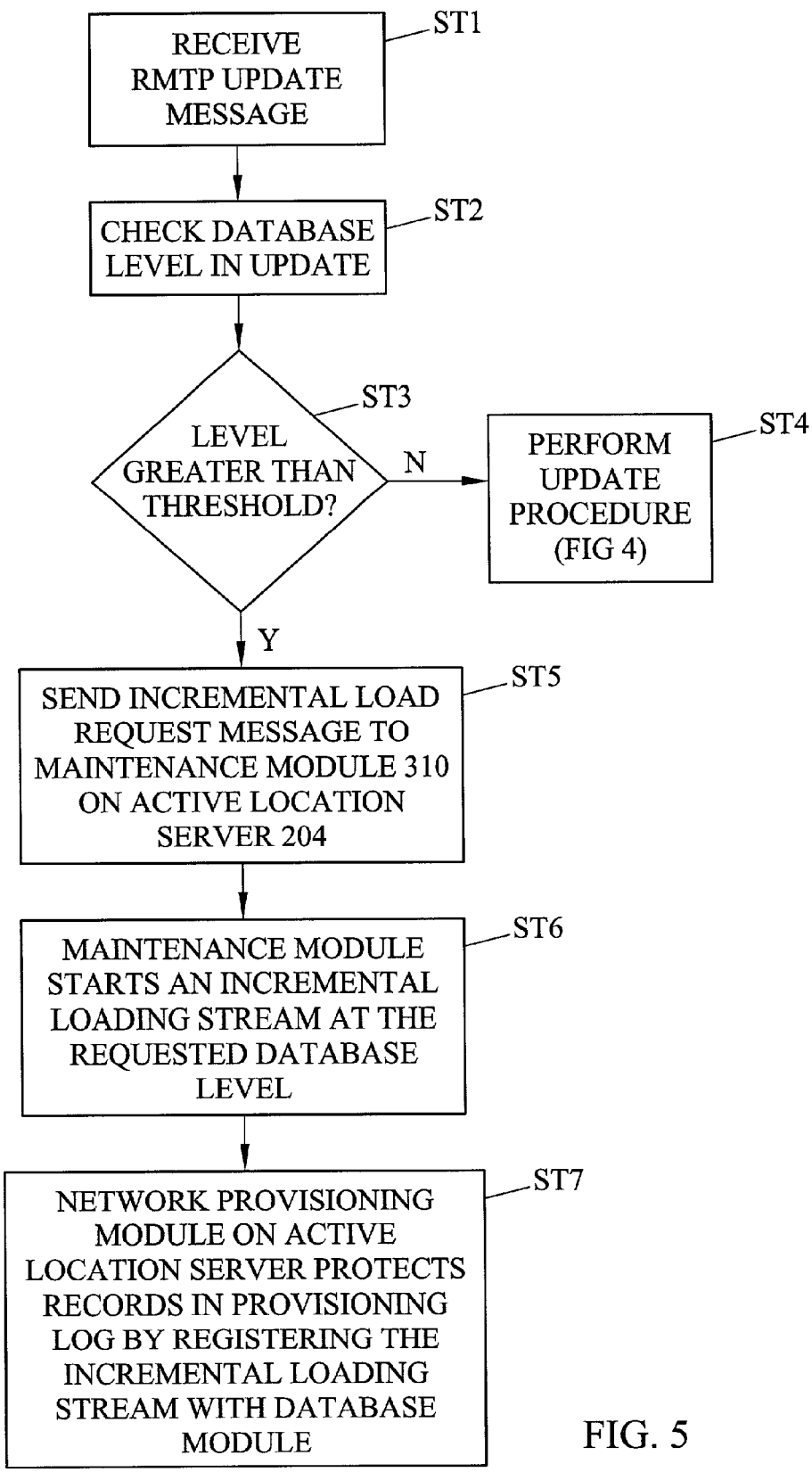
FIG. 5 is a flow chart illustrating exemplary steps that may be performed in incremental loading of a cluster node database according to an embodiment of the present invention.

FIG. 5 is a flow chart illustrating exemplary steps performed by standby location server 206 in performing incremental database loading of its SIP location database. Incremental database loading occurs when standby location server 206 has missed transactions that are still contained in provisioning log 304 of active location server 204. Referring to FIG. 5, in step ST1, standby location server 206 receives an RMTP update message. In step ST2, standby location server 206 checks the database level in the update message. In step ST3, if standby location server 206 determines that the level is not greater than a predetermined threshold level, in step ST4, standby location server 206 performs the database update procedure illustrated in FIG. 4.

If standby location server 206 determines that the level in the update message is greater than the predetermined threshold, control proceeds to step ST5, where standby location server 206 sends an incremental load request message to maintenance module 310 on active location server 204. Step ST6, maintenance module 310 on active location server 204 starts an incremental loading stream to standby location server 206 at the requested database level. In step ST7, network provisioning module 308 on active location server 204 protects the required records in the provisioning log, i.e., those that are the subject of the incremental loading by registering the incremental loading stream with database module 300. Thus, the steps illustrated in FIG. 5 describe incremental loading of the SIP location database on standby location server 206.

Figure 6:
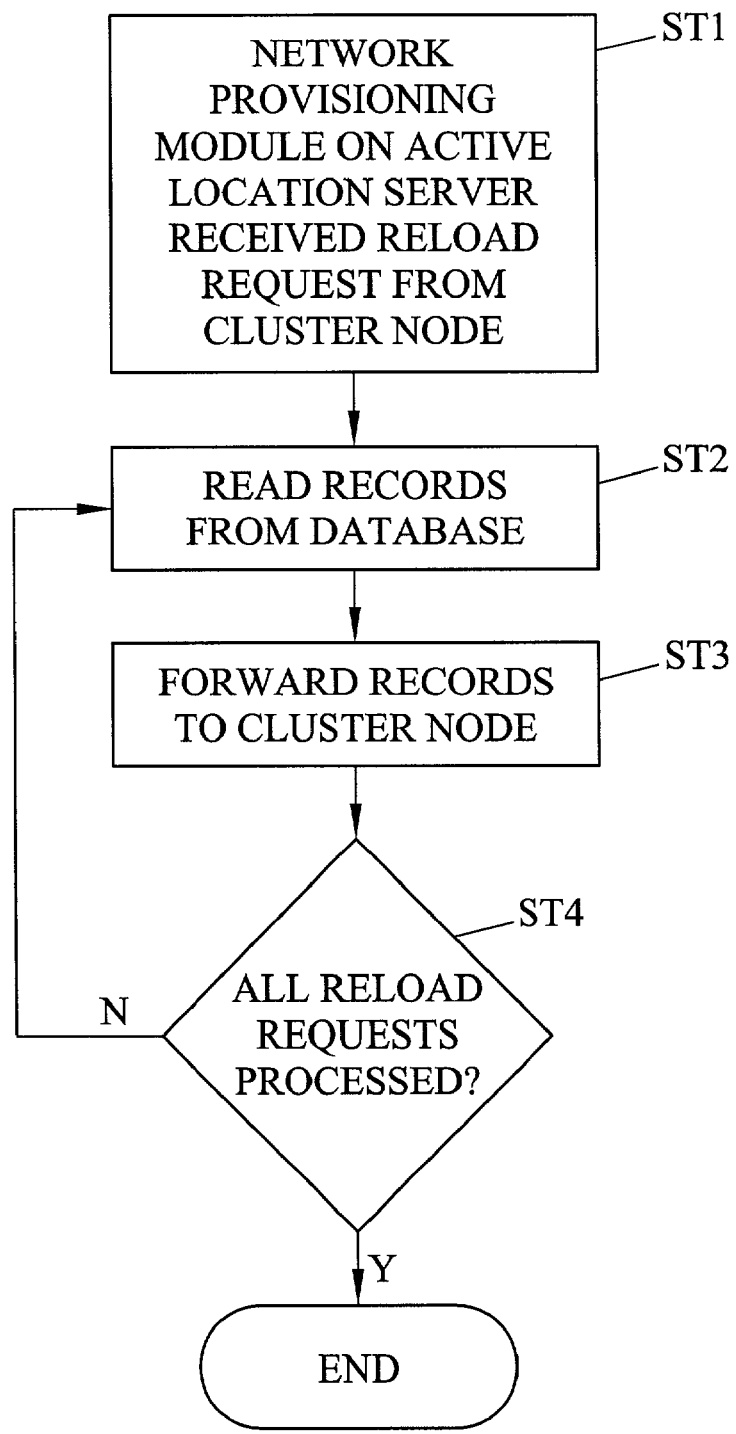
FIG. 6 is a flow chart illustrating exemplary steps for continuous cluster node database reloading according to an embodiment of the present invention.

According to another aspect of the invention, cluster nodes 202 may request continuous reloading from active location server 204. FIG. 6 illustrates exemplary steps performed by cluster nodes 202 and active location server 204 in continuously reloading the SIP location databases maintained by cluster nodes 202. Referring to FIG. 6, in step ST1, network provisioning module 308 on active location server 204 receives a reload request from a cluster node. In step ST2, database module 300 reads records from SIP location database 302 and in step ST3, the records are forwarded to the requesting cluster node. In step ST4, active location server 204 determines whether all requests have been processed. If all requests have not been processed, control returns to step ST2 where records are read from the database and forwarded to the requesting cluster nodes. If all reload request have been processed, the reload procedure ends.

In reading records from SIP location database 302, if active SIP location server 204 receives a request from another cluster node for reloading, active location server 204 uses the existing record stream and notifies location server network provisioning module 308 of the first record read for that cluster node. This process continues until the SIP location databases on all requesting cluster nodes have been reloaded.

Figure 7:
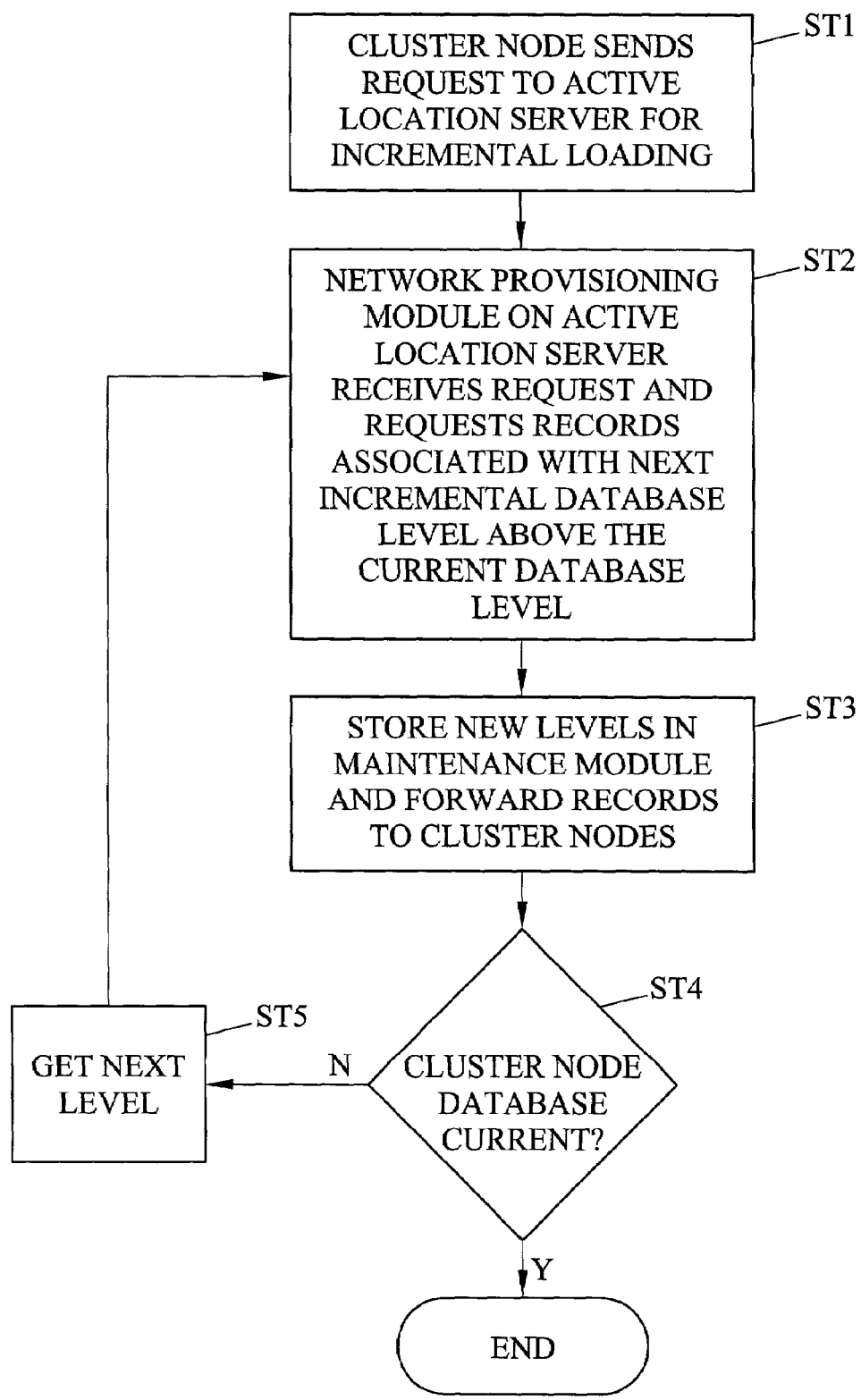
FIG. 7 is a flow chart illustrating exemplary steps for incremental cluster node database loading according to an embodiment of the present invention.

Another function performed by SIP signaling router according to an embodiment of the present invention is cluster node incremental loading. As stated above, incremental loading may occur when a cluster node detects that an update received from active location server 204 is greater than it is expected. FIG. 7 illustrates exemplary steps performed by a cluster node and by the active location server in performing cluster node incremental loading. Referring to FIG. 7, in step ST1, a cluster node sends a request to the active location server for incremental loading. In step ST2, the network provisioning module in the active location server receives the request and requests records from the location database associated with a next incremental database level above the current database level in the request. In step ST3, active location server 204 stores the new levels in the maintenance module and forwards the database records to the cluster nodes. In step ST4, the active location server determines whether the cluster node database is current. If the database is not current, in step ST5, active location server 204 gets the next level and steps ST2 through ST5 are repeated until the cluster node database is current.

According to another aspect, the present invention includes messaging systems for monitoring the operational status of cluster nodes providing SIP proxy services, load sharing between the cluster nodes, and switching between cluster nodes in the event of a failure.

Figure 8:
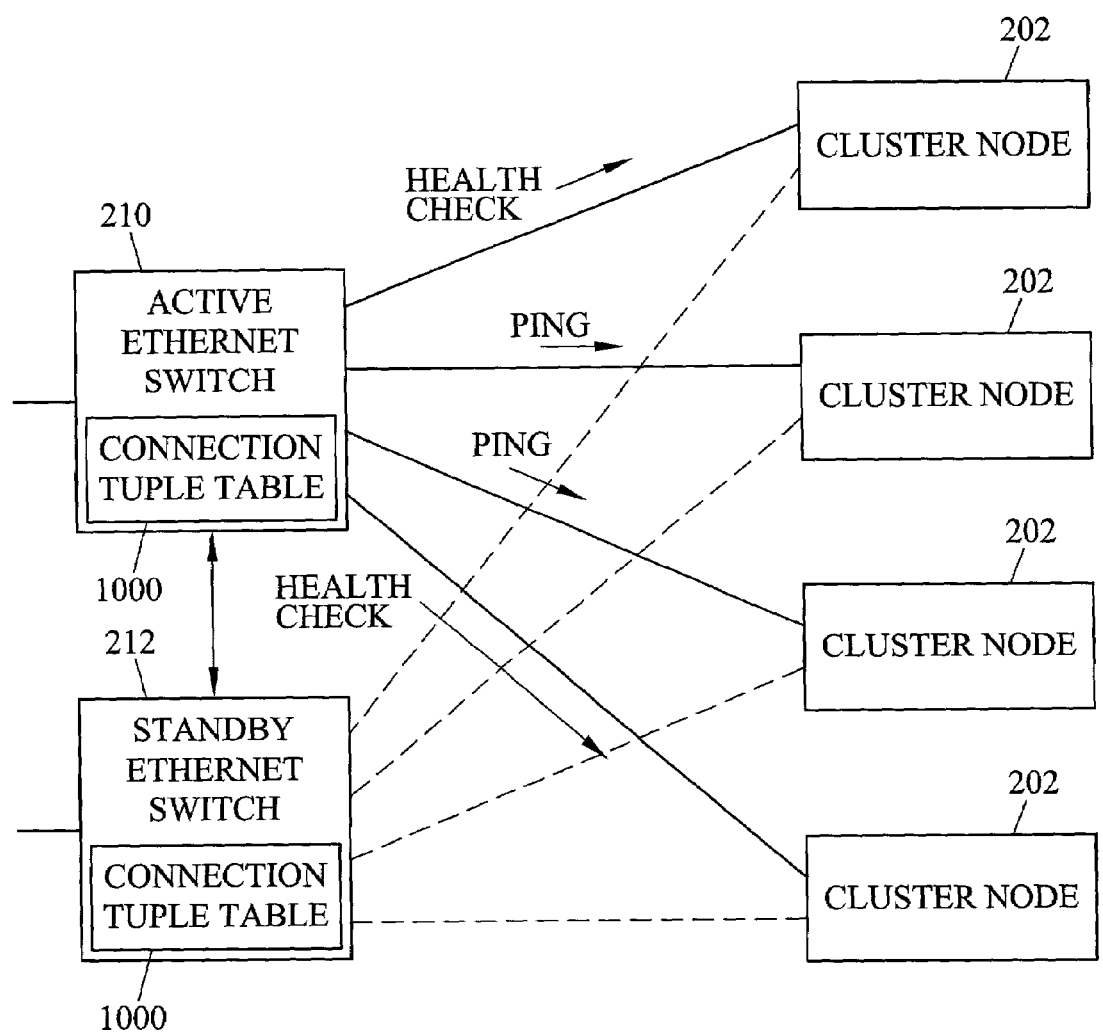
FIG. 8 is a block diagram illustrating a method for monitoring the operational status of cluster nodes providing SIP protocol services according to an embodiment of the present invention.

FIG. 8 is a partial block/partial flow diagram illustrating a method for monitoring the operational status of cluster nodes performing SIP proxy services according to an embodiment of the present invention. In FIG. 8, cluster nodes 202 are each connected to active and standby Ethernet switches 210 and 212. Both active Ethernet switch 210 and standby Ethernet switch 212 maintain a connection tuple table 1000 that contains the following information for each connection maintained by cluster nodes 202:

Destination IP Address, Originating IP Address, Destination Port Number, Originating Port Number, and MAC Address of the Cluster Node Associated With the Connection.

The connection tuple tables 1000 allow active and standby Ethernet switches 210 and 212 to keep track of the number of connections maintained by each cluster node 202.

In order to determine the operational status of cluster nodes 202, in the illustrated embodiment, active Ethernet switch 210 sends health check and packet Internet groper (PING) message to each of cluster nodes 202. The PING and health check messages may be sent periodically. The PING messages determine the functionality of protocol layers 1–3 of the protocol stack executing on each cluster node 202. The health check messages determine the application level health of cluster nodes 202. Accordingly, if a cluster node fails to respond to a PING message there is no need to send a health check message to that cluster node.

In addition to being useful for monitoring the operational status of the cluster node, the PING and health check messages may be used along with the connection tuple tables to perform load sharing among cluster nodes. For example, active Ethernet switch 210 may monitor the response time of each cluster node 202 for responding to a PING or health check message. The response time is indicative of the load on each cluster node 202. The connection tuple table 1000 could be used to determine the number of connections maintained by each cluster node. Load sharing may be performed based on the response time and the number of connections managed by a given cluster node. For example, it may be desirable to increase message flow to a cluster node that responds quickly and has a small number of connections in its connection table. Any combination of response time and number of active connections may be used as a basis for load sharing.

When one of the Ethernet switches 210 and 212 fails or when one or more ports associated with switches 210 and 212 fail, it may be desirable to switch to the other Ethernet switch or port. According to the present invention, Ethernet switches 210 and 212 include a trunking capability that allows switch over from one Ethernet switch to the other Ethernet switch in the event of failure. This trunking capability is described in IEEE 802.3ad, the disclosure of which is incorporated herein by reference in its entirety.

IEEE 802.3ad includes a link aggregation standard that provides inherent, automatic redundancy on point-to-point links. In other words, should one of the multiple ports used in a link fail, network traffic is dynamically redirected to flow across the remaining good ports in the link. The redirection is fast and triggered when a switch learns that a media access control address has been automatically reassigned from one link port to another in the same link. The switch then sends the data to the new port location, and the network continues to operate with virtually no interruption in service.

The emerging IEEE 802.3ad specification will deliver switch-to-switch and switch-to-server incremental bandwidth increases in a way that also brings inherent failover capabilities to Ethernet networks. Link aggregation works by making two to six or more physical links appear as a single logical link to Spanning Tree and any other Layer 2 or 3 protocol. At the same time, link aggregation makes automatic failover possible by enabling the physical links to serve as redundant backups to one another.

The 802.3ad specification adds a link aggregation sublayer to the conventional Ethernet protocol stack at Open Systems Interconnection Layer 2, the media access control (MAC) layer. This sublayer effectively separates the physical connections below from the new, logical MAC address it shows to higher level protocols. Within the sublayer, a link aggregation control protocol (LACP) performs functions that range from verifying configurations and operating status of participating devices to carrying out the distribution tasks necessary for assigning packet flows to their physical links.

The LACP also carries out the collection tasks necessary for receiving incoming packets. Also, the protocol contains a control function for adding and deleting physical links. The distribution mechanism determines which packet flows will go over which physical links. In the event of a link failure, the control function alerts the distributor, which then reassigns the packet flows. Because the operations are carried out low in the OSI protocol model, failure detection and reselection can occur very quickly, typically in less than a second.

Switches 210 and 212 of SIP signaling router 200 illustrated in FIG. 2 may utilize the IEEE 802.3ad link aggregation control protocol to dynamically re-route SIP signaling traffic around congested a failed links. For example, switch 210 may have multiple physical links connected to one of the cluster nodes that are aggregated into a single logical link using the LACP protocol. When switch 210 detects or is notified of a failure of one of the physical links, traffic is dynamically redirected to another physical link within the logical link. This dynamic redirection is accomplished at the link aggregation sublayer, and as a result, is transparent to higher layers.

Figure 9:
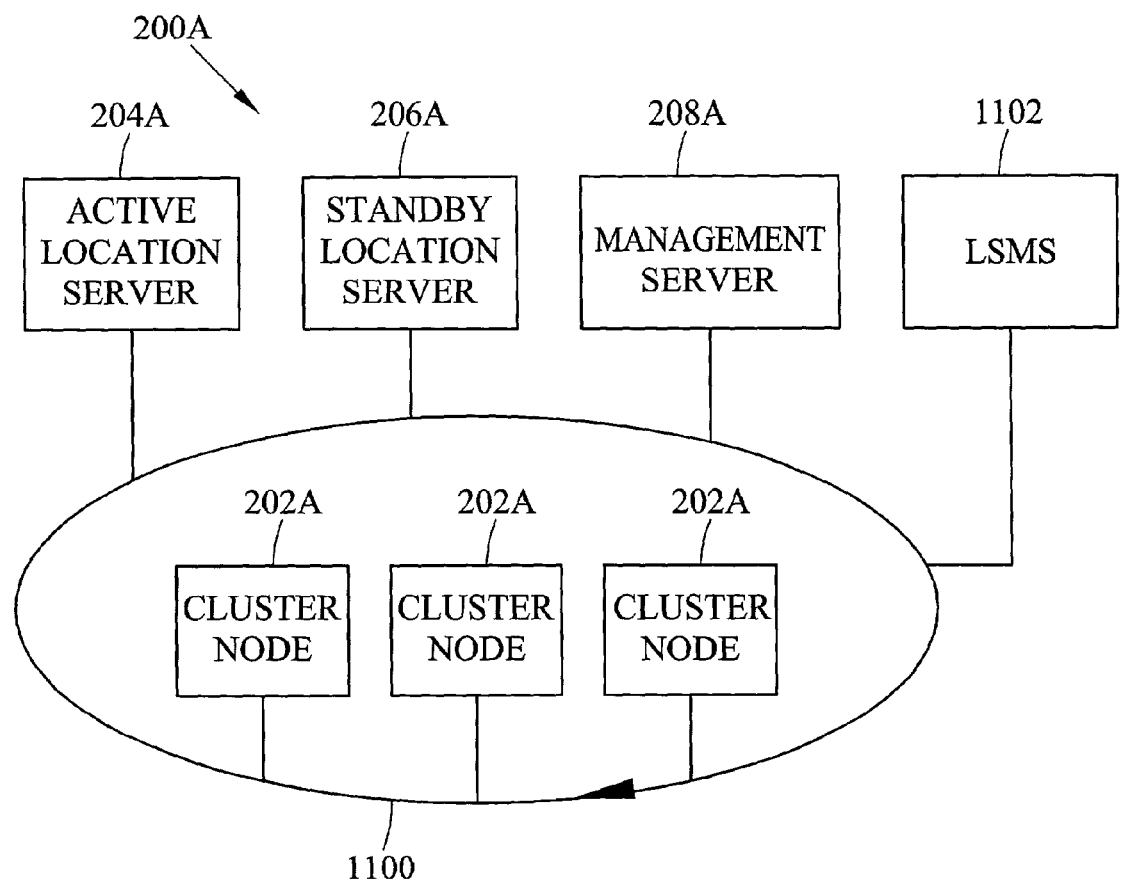
FIG. 9 is a block diagram of a scalable, reliable SIP signaling router according to an alternate embodiment of the present invention.

FIG. 9 illustrates an alternate embodiment of a SIP signaling router according to the present invention. In the illustrated embodiment, SIP signaling router 200A comprises a plurality of printed circuit boards connected via a communications bus. Each printed circuit board includes one or more microprocessors. For example, each printed circuit board may include an application processor for performing SIP functions and a communications processor for communicating via the communications bus. In the illustrated example, active location server 204A replicates its local database of SIP location information to cluster nodes 202A via the communications bus. In a preferred embodiment of the invention, communications bus 1100 comprises a dual, counter rotating serial bus. Local subsystem management system (LSMS) 1102 provisions the data stored in the SIP location database managed by active location server 204A. LSMS 1102 may also interface with an external device to receive database information from a user.

The underlying hardware illustrated in FIG. 9 is similar to the hardware architecture of an EAGLE® signal transfer point available from Tekelec of Calabasas, Calif. However, rather than performing signaling system seven routing functions, the SIP signaling router illustrated in FIG. 9 performs SIP routing functions.

It will be understood that various details of the invention may be changed without departing from the scope of the invention. Furthermore, the foregoing description is for the purpose of illustration only, and not for the purpose of limitation—the invention being defined by the claims.

What is claimed is:

1. A session initiation protocol (SIP) signaling router comprising:

(a) a plurality of cluster nodes for performing at least one session initiation protocol function, each cluster node storing a local database containing SIP location information; and (b) a location server coupled to the cluster nodes for maintaining a database of SIP location information and for automatically replicating the database of SIP location information to each of the cluster nodes in real time in response to receiving updates to the SIP location information, wherein each of the cluster nodes contain common SIP location information and wherein each of the cluster nodes is adapted to route SIP signaling messages using SIP location information contained in the local database at each cluster node without querying the location server.

2. The SIP signaling router of claim 1 wherein each of the cluster nodes comprises a SIP proxy server.

3. The SIP signaling router of claim 1 wherein each of the cluster nodes comprises a SIP redirect server.

4. The SIP signaling router of claim 1 wherein each of the cluster nodes comprises a SIP proxy server and a SIP redirect server.

5. The SIP signaling router of claim 1 wherein the location server is adapted to replicate the database of SIP location information to each of the cluster nodes using a reliable multicast transport protocol (RMTP).

6. The SIP signaling router of claim 1 comprising first and second layer 2 switches coupled to each of the cluster nodes.

7. The SIP signaling router of claim 6 wherein each of the cluster nodes include first and second network interfaces and the first layer 2 switch is coupled to the first network interface of each of the cluster nodes and the second layer 2 switch is coupled to the second network interface of each of the cluster nodes.

8. The SIP signaling router of claim 7 wherein at least one of the first and second layer 2 switches is configured to periodically ping each of the cluster nodes to determine sub-application level protocol stack operational status of the cluster nodes.

9. The SIP signaling router of claim 7 wherein the first layer 2 switch is adapted to periodically send health check messages to each of the cluster nodes to determine application-level operational status.

10. The SIP signaling router of claim 9 wherein the first layer 2 switch is adapted to determine the operational status based on the response time of each of the cluster nodes to the health check messages.

11. The SIP signaling router of claim 6 wherein the first and second layer 2 switches are redundantly connected to each of the cluster nodes.

12. The SIP signaling router of claim 11 wherein the first and second layer 2 switches are adapted to dynamically reroute SIP signaling traffic around congested or failed signaling links using a link aggregation control protocol.

13. The SIP signaling router of claim 1 wherein the cluster nodes and the location server each comprise stand alone computers or workstations.

14. The SIP signaling router of claim 1 further comprising an interprocessor message transport bus for carrying message between the cluster nodes and the location server, wherein the cluster nodes and the location server each comprise a printed circuit board connected to the interprocessor message transport bus.

15. A session initiation protocol (SIP) signaling router comprising:

(a) a plurality of cluster nodes for performing at least one session initiation protocol function, each cluster node storing a local database containing SIP location information; and (b) a location server coupled to the cluster nodes for maintaining a database of SIP location information and for automatically replicating the database of SIP location information to each of the cluster nodes in real time in response to receiving updates to the SIP location information, wherein the location server includes:

(i) a provisioning database task for provisioning the SIP location information in the database;

(ii) a database provisioning log for tracking changes to the database; and (iii) a network provisioning task for detecting updates to the database based on the database provisioning log and for distributing the updates to the cluster nodes in real time in response to detecting the updates.

16. The SIP signaling router of claim 15 wherein the network provisioning task is adapted to multicast the updates to the cluster nodes.

17. The SIP signaling router of claim 15 wherein the network provisioning task is adapted to multicast the updates to the cluster nodes using the reliable multicast transport protocol.

18. A method for routing session initiation protocol (SIP) signaling messages, the method comprising:

(a) replicating a database of SIP location information from a location server to a plurality of cluster nodes such that the cluster nodes store common SIP location information, each cluster node performing a SIP protocol function and storing the SIP location information in a local database at each of the cluster nodes;

(b) receiving SIP signaling messages at the cluster nodes for requesting SIP protocol services;

(c) determining SIP location information for the SIP signaling messages in real time using the local databases at the cluster nodes without querying the location server; and (d) responding to the SIP signaling messages using the SIP location information contained in the local database at each cluster node without querying the location server.

19. The method of claim 18 wherein replicating a database of SIP location information to the cluster nodes includes forwarding database updates to the cluster nodes using the reliable multicast transport protocol.

20. The method of claim 18 wherein the SIP signaling messages include SIP INVITE messages.

21. A method for routing session initiation protocol (SIP) signaling messages, the method comprising:

(a) replicating a database of SIP location information from a location server to a plurality of cluster nodes, each cluster node performing a SIP protocol function;

(b) receiving SIP signaling messages at the cluster nodes for requesting SIP protocol services; and (c) determining SIP location information for the SIP signaling messages in real time using the local databases at the cluster nodes without querying the location server, wherein replicating a database of SIP location information to the cluster nodes includes notifying the cluster nodes of incremental changes in the database level at the location server and incrementally updating the location databases maintained by the cluster nodes as changes are made to the database maintained by the location server.

22. A method for routing session initiation protocol (SIP) signaling messages, the method comprising:

(a) replicating a database of SIP location information from a location server to a plurality of cluster nodes, each cluster node performing a SIP protocol function;

(b) receiving SIP signaling messages at the cluster nodes for requesting SIP protocol services; and (c) determining SIP location information for the SIP signaling messages in real time using the local databases at the cluster nodes without querying the location server, wherein replicating a database of SIP location information to the cluster nodes includes reloading the database on each of the cluster nodes when a database level difference between the cluster nodes and the location server exceeds a predetermined threshold.

* * * * *